United States Patent
McEwan et al.

(10) Patent No.: US 11,477,994 B2
(45) Date of Patent: Oct. 25, 2022

(54) PROTEIN EXTRACTION FROM SPENT GRAINS

(71) Applicant: COORS BREWING COMPANY, Denver, CO (US)

(72) Inventors: Roderick Nairn McEwan, Argyll Rhu (GB); Roderick Ian White, Tutbury (GB)

(73) Assignee: Coors Brewing Company, Denver, CO (US)

(*) Notice: Subject to any disclaimer, the term of this patent is extended or adjusted under 35 U.S.C. 154(b) by 279 days.

(21) Appl. No.: 16/634,353

(22) PCT Filed: Jul. 27, 2018

(86) PCT No.: PCT/US2018/044198
§ 371 (c)(1),
(2) Date: Jan. 27, 2020

(87) PCT Pub. No.: WO2019/023647
PCT Pub. Date: Jan. 31, 2019

(65) Prior Publication Data
US 2020/0260757 A1 Aug. 20, 2020

Related U.S. Application Data

(60) Provisional application No. 62/538,463, filed on Jul. 28, 2017.

(51) Int. Cl.
*A23J 1/12* (2006.01)
*A23J 1/00* (2006.01)
(Continued)

(52) U.S. Cl.
CPC .............. *A23J 1/005* (2013.01); *A23J 1/12* (2013.01); *A23L 3/36* (2013.01); *B02C 23/12* (2013.01);
(Continued)

(58) Field of Classification Search
CPC ...... A23J 1/12; A23J 1/005; A23J 1/00; A23L 3/36; A23L 1/10; C12C 11/00
See application file for complete search history.

(56) References Cited

U.S. PATENT DOCUMENTS 3,212,902 A 10/1965 Bavisotto
3,327,852 A 6/1967 Mortsell
(Continued)

FOREIGN PATENT DOCUMENTS

CA 1317413 5/1993
WO WO 2004/053108 6/2004
(Continued)

OTHER PUBLICATIONS

International Search Report and Written Opinion for International (PCT) Patent Application No. PCT/US2018/044198, dated Oct. 17, 2018.
(Continued)

*Primary Examiner* — Hong T Yoo
(74) *Attorney, Agent, or Firm* — Sheridan Ross P.C.

(57) ABSTRACT

Methods and systems are provided for the extraction of protein rich flour and fiber rich flour from brewer's spent grains (BSG). The extraction of protein from the BSG may include preparing the BSG by controlling the temperature in a hot grain storage system and in some cases dewatering the BSG to acceptable moisture content levels. In extracting the protein rich and fiber rich flour, the BSG is conveyed to a device that dries, mills, and fractionates the BSG into separated protein and fiber extract.

20 Claims, 7 Drawing Sheets

(51) Int. Cl.
*A23L 3/36* (2006.01)
*B02C 23/12* (2006.01)
*C12C 1/16* (2006.01)
*B02C 18/22* (2006.01)

(52) U.S. Cl.
CPC ............ *C12C 1/16* (2013.01); *A23V 2002/00* (2013.01); *B02C 18/2225* (2013.01)

(56) References Cited

U.S. PATENT DOCUMENTS

| | | |
|---|---|---|
| 4,919,952 A | 4/1990 | Sadaranganey et al. |
| 5,156,877 A | 10/1992 | Kishi et al. |
| 5,702,748 A | 12/1997 | Kishi et al. |
| 2001/0041199 A1 | 11/2001 | Davids |
| 2008/0020121 A1 | 1/2008 | Dohi et al. |
| 2013/0089640 A1 | 4/2013 | Lohscheidt et al. |
| 2013/0150461 A1 | 6/2013 | Taylor et al. |
| 2014/0134697 A1 | 5/2014 | Bijl et al. |
| 2015/0132822 A1 | 5/2015 | Lopez de Leon et al. |
| 2015/0275158 A1 | 10/2015 | Heldt-Hansen et al. |
| 2015/0305370 A1 | 10/2015 | Bleyer et al. |
| 2016/0002680 A1 | 1/2016 | Kozubal et al. |
| 2016/0010127 A1 | 1/2016 | Wu et al. |

FOREIGN PATENT DOCUMENTS

| | | |
|---|---|---|
| WO | WO 2005/029974 | 4/2005 |
| WO | WO 2013/021161 | 2/2013 |

OTHER PUBLICATIONS

"Cell Mill plant" Uploaded to YouTube by atritorlimited, Dec. 7, 2011, retrieved from https://www.youtube.com/watch?v=H3MWFK974SA, 3 pages.

"Dynamic classifiers improve pulverizer performance and more," Power Mag, May 21, 2015, retrieved from https://web.archive.org/web/20150521162526/https://www.powermag.com/dynamic-classifiers-improve-pulverizer-performance-and-more/, 2 pages.

"Monitoring grain temperature and aerating grain," Canadian Grain Commission, Oct. 1, 2013, 4 pages.

"Spoilage and heating of stored agricultural products," Canadian Grain Commission, Dec. 21, 2009, 41 pages.

Inglett et al., "High-shear, Jet-cooking, and Alkali Treatment of Corn Distillers' Dried Grains to Obtain Products with Enhanced Protein, Oil, and Phenolic Antioxidants," Food Science and Technology International, Jul. 9, 2010, 1 page. Abstract only.

Ervin et al., "Extraction and Precipitation of Proteins from Brewer's Spent Grain," Canadian institute of Food Science and technology, vol. 22, No. 3, 1989, pp. 216-221.

Tang et al., "Recovery of Protein from Brewer's Spent Grain by Ultrafiltration," Biochemical Engineering Journal, vol. 48, 2009, 5 pages.

Third Party Observation for International (PCT) Patent Application No. PCT/US2018/044198, dated Nov. 19, 2019, 4 pages.

International Preliminary Report on Patentability for International (PCT) Application No. PCT/US2018/044198, dated Feb. 6, 2020, 12 pages.

Official Action for Canada Patent Application No. 3071422, dated Mar. 30, 2021, 3 pages.

Notice of Allowance for Canada Patent Application No. 3071422, dated Nov. 22, 2021, 1 page.

"Cell Mill," Atritor Limited, Jul. 15, 2017, retrieved from http//www.atritor.com/en/products/cell-mill, 3 pages.

"Grain Temperature Monitoring Systems," Tri-States Grain Conditioning, Inc., archived webpage dated May 16, 2017, retrieved from https://web.archive.org/web/20170516151439/https://www.co-alliance.com/wp-content/uploads/2015/10/VITLINK2.pdf, 8 pages.

Vieira et al., "Valuation of brewer's spent grain using a fully recyclable integrated process for extraction of proteins and arabinoxylans," Industrial Crops & Products, 2014, vol. 52, pp. 136-143.

| Mass Split (Protein Flour : Fiber) | Protein % in Flour Fraction | Protein % in Fiber |
|---|---|---|
| 70 : 30 | 28% | 12% |
| 50 : 50 | 30% | 15% |
| 20 : 80 | 38%+ | 17% |

| Protein Composition: | |
|---|---|
| Amino Acid | g/100g |
| Alanine | 1.47 |
| Arginine | 1.72 |
| Asparagine | N/A |
| Aspartic Acid | 2.19 |
| Cysteine | N/A |
| Glutamic Acid | 6.07 |
| Glutamine | N/A |
| Glycine | 1.24 |
| Histidine | 0.69 |
| Isoleucine | 1.26 |
| Leucine | 2.35 |
| Lysine | 1.30 |
| Methionine | N/A |
| Phenylalanine | 1.62 |
| Proline | 2.92 |
| Serine | 1.36 |
| Threonine | 1.14 |
| Tryptophan | N/A |
| Tyrosine | 1.11 |
| Valine | 1.71 |

↙ 604

| Nutritional: | | |
|---|---|---|
| Moisture | <10 | % wt |
| Protein | 32 | % wt |
| Fat | 13 | % wt |
| of which saturates | 2.9 | % wt |
| of which mono-unsaturates | 1.2 | % wt |
| of which polyunsaturates | 8.2 | % wt |
| Carbohydrate | 15 | % wt |
| Dietary Fiber | 31 | % wt |
| Sugars | <0.50 | % wt |
| Ash | 4.8 | % wt |
| Sodium | 0.02 | % wt |

| Energy in kcal | 365 | kcal/100g |
|---|---|---|
| Energy in kJ | 1520 | kJ/100g |

*Fig. 6*

| Protein Composition: | |
|---|---|
| Amino Acid | g/100g |
| Alanine | 0.87 |
| Arginine | 0.99 |
| Asparagine | N/A |
| Aspartic Acid | 1.28 |
| Cysteine | N/A |
| Glutamic Acid | 3.09 |
| Glutamine | N/A |
| Glycine | 0.76 |
| Histidine | 0.39 |
| Isoleucine | 0.68 |
| Leucine | 1.30 |
| Lysine | 0.83 |
| Methionine | N/A |
| Phenylalanine | 0.88 |
| Proline | 1.42 |
| Serine | 0.79 |
| Threonine | 0.66 |
| Tryptophan | N/A |
| Tyrosine | 0.56 |
| Valine | 0.97 |

| Nutritional: | | |
|---|---|---|
| Moisture | <10 | % wt |
| Protein | 14 | % wt |
| Fat | 8 | % wt |
| of which saturates | 1.7 | % wt |
| of which mono-unsaturates | 0.8 | % wt |
| of which polyunsaturates | 5.2 | % wt |
| Carbohydrate | 67 | % wt |
| Dietary Fiber | 64 | % wt |
| Sugars | 2.6 | % wt |
| Ash | 3.8 | % wt |
| Sodium | 0.01 | % wt |

| Energy in kcal | 267 | kcal/100g |
|---|---|---|
| Energy in kJ | 1094 | kJ/100g |

*Fig. 7*

PROTEIN EXTRACTION FROM SPENT GRAINS

CROSS REFERENCE TO RELATED APPLICATIONS

This application is a national stage application under 35 U.S.C. 371 and claims the benefits of PCT Application No. PCT/US2018/044198 having an international filing date of 27 Jul. 2018, which designated the United States, which PCT application claimed the benefit of and priority, under 35 U.S.C. § 119(e), to U.S. Provisional Application Ser. No. 62/538,463, filed Jul. 28, 2017, entitled "Protein Extraction from Spent Grains." The entire disclosures of the applications listed above are hereby incorporated herein by reference, in their entirety, for all that they teach and for all purposes.

FIELD

The present disclosure is generally directed to protein extraction methods and systems, in particular, toward methods and systems that extract protein from spent grains.

BACKGROUND

Brewer's spent grain (BSG) is a major by-product of the brewing industry, representing about 85% of the total by-products generated. Although BSG is rich in fiber and protein, its main use has been as animal feed. There has been interest in expanding the use of BSG, but there has not been a solution that can feasibly be scaled to volume. Every ton of BSG processed produces a ton of BSG. Since centralized municipal composts are unavailable in the vast majority of cities, and distribution of BSG to farms is costly and time-sensitive, urban brewers typically have no choice but to relegate their BSG to a landfill.

In some industries, ethical concerns may prevent BSG from being used without conditions. For instance, vegan breweries choose to send their BSG to the landfill because they do not support sending their BSG to the animal farming industry. Alternatively, it is common for a brewery to produce more BSG than local farms can consume. In this situation, the BSG may also end up in a landfill.

DETAILED DESCRIPTION

It is with respect to the above issues and other problems that the embodiments presented herein were contemplated. Embodiments of the present disclosure will be described in connection with a spent grain protein extraction system. In general, embodiments of the present disclosure provide methods, devices, and systems for extracting protein rich and fiber rich product (e.g., flour, etc.) from spent grains, such as brewer's spent grains (BSG). In some embodiments, the methods and systems disclosed herein may extract protein rich and fiber rich flour, or product, from spent grains using an all-dry process (e.g., a process that does not require chemical treatment, rinsing, and/or high water usage, etc.). It is an aspect of the present disclosure to convert BSG into a stable product having an extended shelf life and enhanced protein percentage over conventional products.

Figure 1:
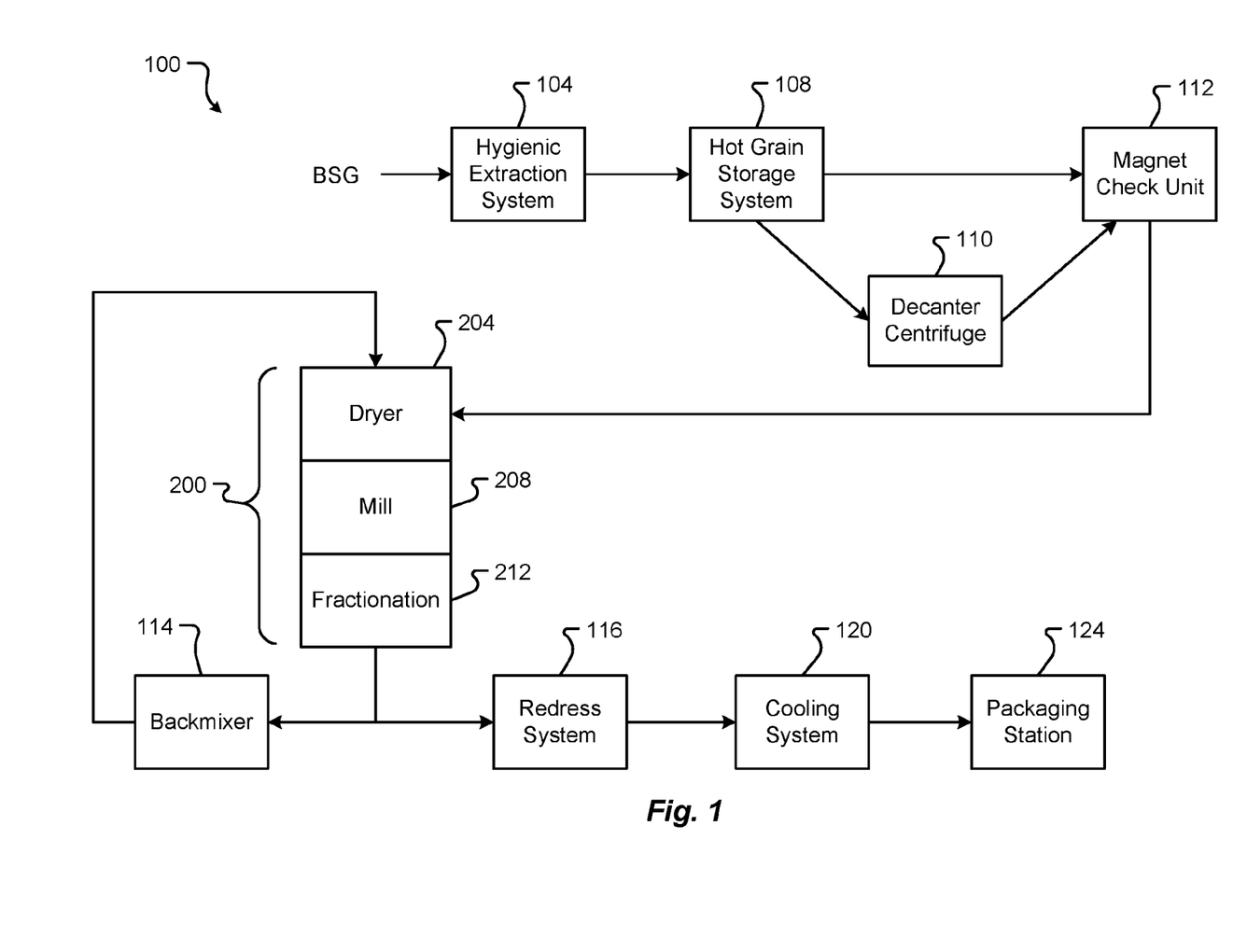
FIG. 1 is a block diagram of a system for harvesting protein and fiber rich flour from BSG in accordance with embodiments of the present disclosure.

FIG. 1 shows a block diagram of a spent grains protein and fiber product extraction system 100 in accordance with embodiments of the present disclosure. The extraction system 100 may include a hygienic extraction device or system 104, a hot grain storage system 108, a decanter centrifuge 110, a magnet check device or unit 112, a cell mill system 200, a backmixer 114, a magnet redress system 116, a cooling system 120, and a packaging station 124 and/or facility that packages the finished product for storage and/or transport.

The BSG may enter the extraction system 100 via a hygienic extraction system 104. Conventional spent grains, or BSG, may be stored in standard containers, such as pails, canisters, skips, or other receptacles. These standard containers may include exposed volumes, uncoated surfaces, non-food grade plastics, and/or unhygienic surfaces and/or materials. The extraction system 100 may require food grade interfaces, transfer equipment, augers, storage containers, and the like. In one embodiment, the hygienic extraction system 104 may include one or more pumps or augers configured to transfer BSG from a brewer's controlled equipment to the hot grain storage system 108.

The hot grain storage system 108 may comprise a silo and a heating device configured to store and regulate the temperature of the BSG. In one embodiment, the hot grain storage system 108 may include a temperature sensing unit and/or temperature controller configured to efficiently manage the temperature control process of the BSG. The hot grain storage system 108 may include an aeration fan to provide steady air flow through the BSG. In some embodiments, BSG in the system 108 may be heated, or otherwise temperature controlled, at a predetermined temperature using positive pressure aeration systems, working together with the aeration fan to move a warming zone through the BSG. Multiple cycles may be applied depending on the time needed for a warming zone to completely move through the stored BSG mass.

In some embodiments, the received BSG may need to be dewatered to reduce its moisture content for processing in the extraction system 100. For example, in the event that BSG was received from a lauter tun in the brewing process, the moisture content of the BSG may be determined to be above a threshold value. Continuing this example, the BSG may be determined to be between approximately 20% to 27% dry. While the BSG may be dried to over 30% dry with a mash filter, BSG from a lauter tun may be dewatered to 30% to 39% or more dry using a dewatering device, such as a decanter centrifuge 110. In some embodiments, the decanter centrifuge 110 may include a feed tube, an adjustable ring, a gear box, a solids discharge chamber, a liquids discharge chamber, an exterior bowl, a scroll conveyor, a motor, a reduction gear, a main bearing, and/or a separator vane stack. The decanter centrifuge 110 may use continuous rotation to increase the rate of settling whereby the BSG, having a higher density than water, falls to the bottom of a mixture, while the water is suspended above it. Once the BSG is determined to have an acceptable moisture content (e.g., at or below predetermined threshold value, etc.) the BSG may be directed to a magnet check unit 112.

The magnet check unit 112 may be configured to remove, collect, and/or clear foreign material from the BSG. For example, the magnet check unit 112 may remove ferrous material, magnetic material, and/or other objects from the BSG. In some embodiments, the magnet check unit 112 may have a drum with magnets arranged in alternating poles, a metal discharge chamber and a non-metal discharge chamber. Constructed with a 180-degree stationary magnet system on which a cover revolves, material may be fed onto the drum cover at the leading point of the magnet section, causing magnetic materials to adhere to the drum as it revolves, and subsequently be discharged into the metal discharge chamber as it travels outside of the magnetic trajectory. Non-metal material will free fall forward into the non-metal discharge chamber following their normal trajectory.

Next, the BSG may be separated into protein rich product and fiber rich product via a cell mill 200. The cell mill 200 may comprise one or more devices or systems configured to dry, mill, and/or fractionate the BSG into protein and/or fiber rich product. The cell mill 200 is described in greater detail in conjunction with FIG. 2 below.

In some embodiments, the cell mill 200 may produce a coarse fiber rich material which can be refed into the cell mill 200 for subsequent processing. This process of re-milling coarse material via the cell mill 200 may be known as back mixing. In one embodiment, a backmixer 114 may be used to convey processed coarse fiber rich material from an outlet of the cell mill 200 back into an inlet of the cell mill 200 for further refinement. This process may be repeated until all of the coarse material is processed into fine protein rich product.

Once extracted, the protein rich product and the fiber rich product may be directed into a redressing system 116 to remove, collect, and/or clear foreign material from each of the respective products. The foreign material may be introduced by the cell mill, transfer equipment, exposure, and/or other interruptions in the system 100. In some embodiments, the redressing system 116 may include a crude screen to remove large objects from the products and a magnet to remove ferrous material, magnetic material, and/or other metal objects from the products. In one embodiment, the magnet may be similar, if not identical, to the magnet check unit 112 described above.

The extraction system 100 may employ a cooling system 120 to cool the protein rich and fiber rich product prior to packaging. The cooling system 120 may include a refrigeration unit and one or more chambers, through which, the protein rich and fiber rich product passes to cool. In one embodiment, the cooling system 120 may employ one or more fans, accumulation conveyors, and/or cooling techniques to reduce the temperature of the products prior to packaging. In some embodiments, the cooling system 120 may comprise a cooling unit and a storage compartment to allow the extracted product to be stored at a regulated, cool temperature prior to packaging. Product fed into the cooling station 120 may require cooling to below 30 degrees Celsius.

The extracted product may be diverted into separate areas or along separate paths for packaging at the packaging station 124. For instance, the protein rich product (e.g., flour) may be directed to a protein product packaging area, while the fiber rich product may be directed to a different fiber product packaging area in the packaging station 124. In any event, the packaging station 124 may be configured to package the protein and/or fiber extract into shipping, storage, transport, or other containers. In one embodiment, the containers may be configured as boxes, bags, 25-kilogram sacks, 1-ton bags, or 20-ton bulk loads. In some embodiments, the protein and fiber extract may be packaged in one or more of the containers and stored until ready to be distributed.

Figure 2:
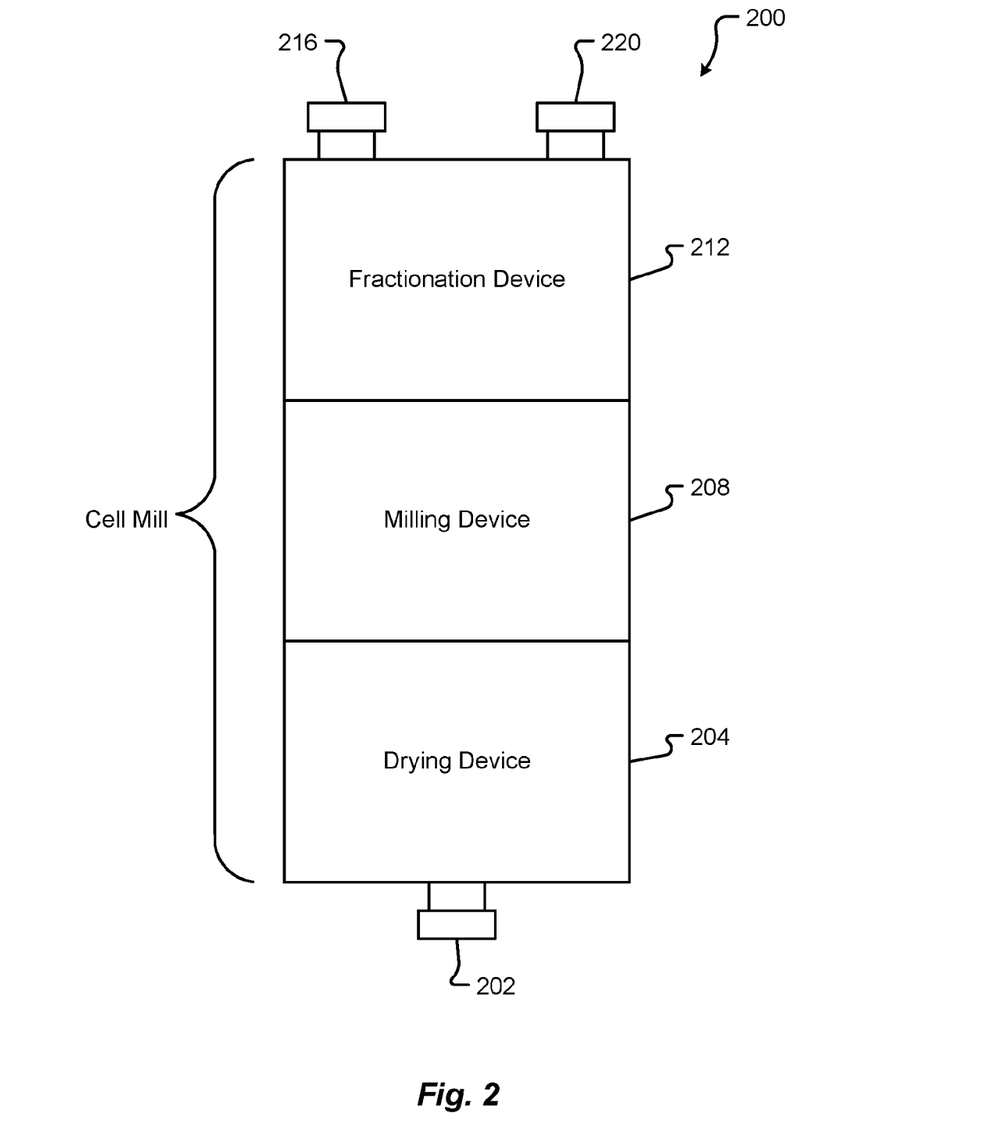
FIG. 2 is a block diagram of a cell mill in accordance with embodiments of the present disclosure.

FIG. 2 is a block diagram of a cell mill 200 in accordance with embodiments of the present disclosure. In one embodiment, the cell mill 200 may be a modified version of the model CM1500 cell mill manufactured by Atritor, or equivalent combination milling system, which may contain a drying device, a milling device, and a fractionation device in a single machine. The cell mill 200 may include an infeed 202, or inlet, and one or more outlets 216, 220. The infeed 202 may receive the BSG for processing, a first outlet 216 of the cell mill 200 may outfeed the fiber rich product, or coarse material, and the second outlet 220 of the cell mill 200 may outfeed the protein rich product, or fine material.

In one embodiment, the BSG may enter the cell mill 200 via a drying device 204. The drying device 204 may include an indirect gas fired system that filters fresh air as it is drawn into the cell mill 200 to remove any particles or insects that could end up in the product. In some embodiments, the drying device 204 may produce heat at a temperature of up to 450 degrees Celsius or more. In some embodiments, the drying device 204 may be operated at a temperature between 300-350 degrees Celsius.

The milling device 208 may include a number of rotating blades arranged on a shaft configured to grind the BSG into a coarse and fine material. The coarse material may be associated with a fiber rich product and the fine material may be associated with a protein rich product, or flour. In some embodiments, the milling device 208 may include a frequency inverter, or other controller, to regulate the speed of the milling device 208. The speed of the milling device 208 may be selected and/or adjusted to produce the desired particle size of the flour and/or the fiber extract. Higher milling speeds tend to mill more material into fine particles and generate a higher concentration of protein rich flour. In some embodiments, the cell mill 200 may feed material (e.g., BSG, spent grains, etc.) into the base of the machine with drying and milling operations taking place simultaneously. In one embodiment, the classification described herein may be performed at the top of the cell mill 200.

The fractionation device 212 may include a classifier rotor, a fiber extract discharge vent (e.g., the first outlet 216) and at least one protein flour discharge vent (e.g., the second outlet 220). Fractionation may be achieved via classification on the basis of material or particle size of the extracted product. Running the classifier at slower speeds allows larger particles (e.g., fiber extract, etc.) to pass through, which reduces the protein percentage of the finished product. Running the classifier at faster speeds will allow finer particles to pass and increase the purity, or protein percentage, of the finished product. The classifier may be used to separate fiber and protein extract from the processed BSG into different product discharge vents (e.g., first outlet 216 and second outlet 220).

Figure 3:
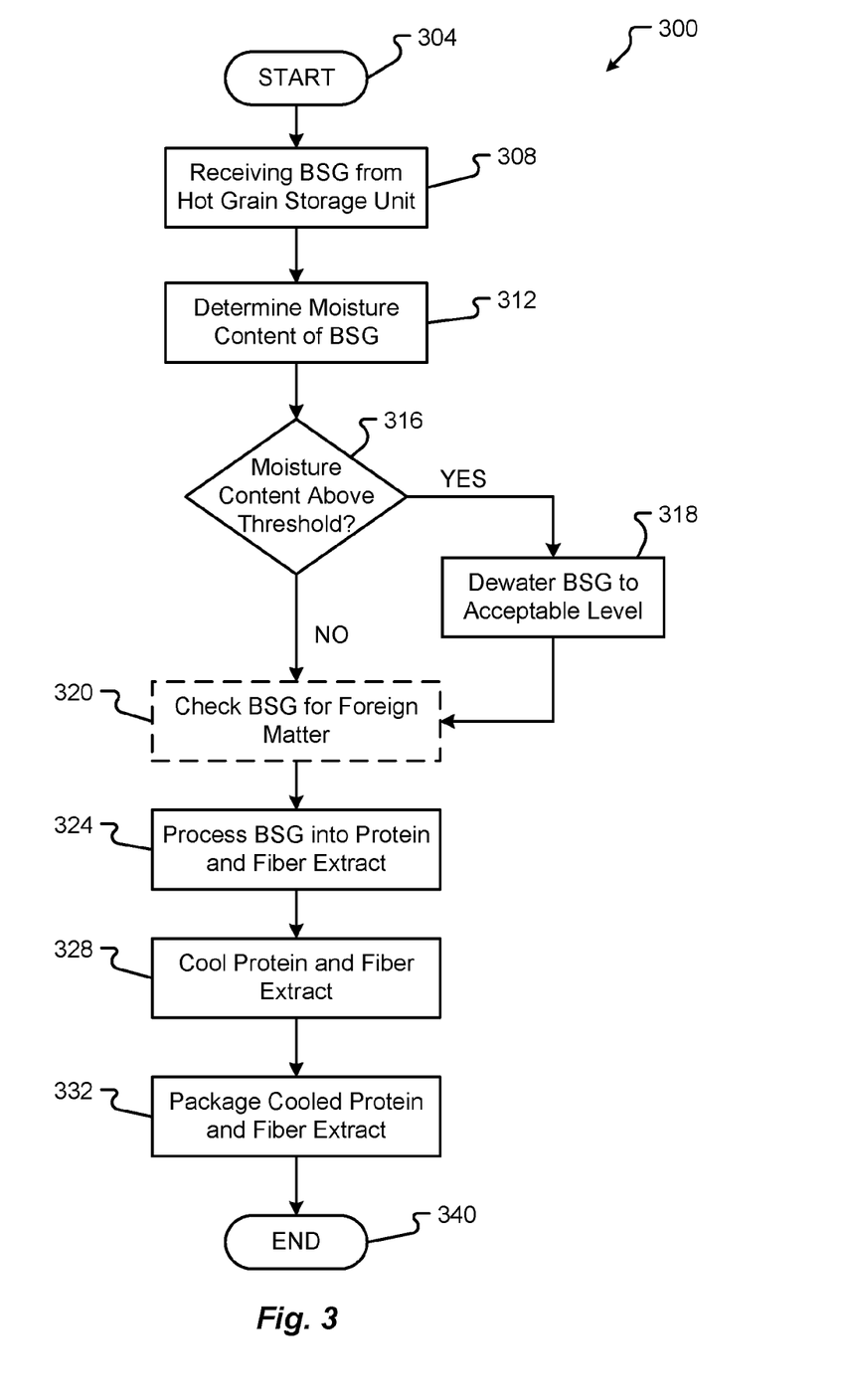
FIG. 3 is a flow diagram of a method for harvesting protein and fiber rich flour from BSG in accordance with embodiments of the present disclosure.

FIG. 3 is a flow diagram of a method 300 for harvesting protein rich and fiber rich product, such as flour, from BSG. While a general order of the steps is shown, the method 300 can include more or fewer steps or can arrange the order of the steps differently than those shown in FIG. 3. In some embodiments, the method 300 may be performed in full, or in part, by a controller comprising a processor and a memory. For example, the controller may be a programmable logic controller (PLC) configured to perform any of the steps of the method 300 automatically and/or in one or more sequences. In one embodiment, the steps of the method 300 may be performed by a number of processors or controllers, associated with one or more of the subsystems, devices, units, and/or systems in the extraction system 100.

The method 300 may begin at step 304 and proceed by receiving BSG from a hot grain storage unit 108 (step 308). The BSG may comprise spent grains from a brewer hygienically controlled and stored. In one embodiment, the BSG may be stored in the hot grain storage system 108 as described in conjunction with FIG. 1. As provided above, the hot grain storage system 108 may be configured to maintain the BSG at a control temperature (e.g., at approximately 76 degrees Celsius, etc.). The control temperature may be selected to control, limit, or eliminate bacterial growth in the stored BSG. In some embodiments, the BSG may be heated to maintain the temperatures of the BSG using at least one heating element and temperature sensor or thermocouple. The temperature sensor may be configured to detect a temperature of the BSG in the hot grain storage system 108 and provide the temperature information to a temperature controller. In this case, the temperature controller may be configured to selectively control the at least one heating element (e.g., providing a power signal activating the heating element when a low temperature, or temperature under the control temperature, is detected and removing the power signal deactivating the heating element when a high temperature, or temperature over the control temperature, is detected, etc.).

In some embodiments, the method 300 may continue by determining the moisture content, or dryness, of the BSG received from the hot grain storage unit 108 (step 312). Moisture content may be measured using one or more moisture sensors in the extraction system 100. The moisture sensors may measure moisture in the BSG via measuring electrical resistance of the BSG, dielectric constant of the BSG, or some other physical contact with the BSG. In one embodiment, the BSG may be measured for moisture by testing a sample of the BSG using gravimetric analysis. Additionally or alternatively, the moisture content of BSG may be estimated based on the source of the BSG in the brewing process. For example, BSG originating from a lauter tun may be determined to have a higher moisture, or water, content than BSG originating from a mash filter.

In any event, the BSG may be analyzed to determine whether the moisture content is within acceptable levels (e.g., at or below a threshold value, etc.) for further processing in the extraction system 100 (step 316). In one embodiment, the threshold value moisture content for the BSG may be set at approximately 30% dry. If the moisture content is determined to be above the threshold value, the method 300 may continue by dewatering the BSG to a level at or below 70% wet (e.g., greater than approximately 30% dry). The BSG may be dewatered using a decanter centrifuge 110, a dehumidifier, a press, a forced air dryer, and/or some other drying mechanism or system. Among other things, drying the BSG to acceptable levels increases the efficiency of the extraction system 100. For instance, once product enters the cell mill 200, the drying device may operate at lower speeds, lower energy levels, and/or lower air flows to dry the BSG for milling and fractionation. In any event, once sufficiently dry, the BSG may be conveyed to a foreign matter check and removal system (step 320). The foreign matter check and removal system may be similar, if not identical, to the magnet check unit 112 described in conjunction with FIG. 1. In some cases, the BSG may be checked for foreign matter using a metal drum, screen, and/or mechanical separator.

Next, the method 300 may continue by processing the BSG into protein rich and fiber rich products (step 324). In one embodiment, the BSG may be processed into protein and fiber extract using a combination of drying, milling, and fractionation. In some embodiments, the process of drying, milling, and fractionation may be performed by a single machine, such as the cell mill 200 described in conjunction with FIG. 2 above. In some embodiments, the cell mill 200 may feed material (e.g., BSG, spent grains, etc.) into the base of the machine with drying and milling operations taking place simultaneously. However, it should be appreciated that one or more of the drying, milling, and fractionation may be performed by a number of different machines and/or systems. The cell mill 200 may use an indirect gas fired system to dry the BSG for optimized protein and fiber extraction. For instance, fresh air may be drawn into the system (filtered to remove any particles/insects, etc.) that could end up in the extracted protein and/or fiber product. In some embodiments, increasing the temperatures used in the dryer 204 of the cell mill may increase the overall capacity (e.g., the capability of the dryer to accommodate more BSG, etc.) of the dryer 204. In some cases, the heat generated by the dryer 204 may be recovered to further increase the efficiency of the cell mill 200.

In processing the BSG (step 324), the cell mill 200 may use a series of rotating blades to extract protein rich product (e.g., fine product, or flour) and fiber rich product (e.g., coarse product) from BSG. The speed and residence time can be manipulated to control the particle size produced by the cell mill 200. Protein particles tend to be softer and mill finer than fiber rich particles. The milling of an abrasive product like BSG may cause mechanical wear of the various components of the cell mill 200 including the rotating blades of the milling device 208. In some cases, for example, where metal rotating blades are used, a redress system 116 may be employed to separate metal particulate and/or other debris from the extracted products (e.g., the protein rich product and the fiber rich product). In some embodiments, the rotating blades may be hardened, coated (e.g., with a ceramic coating, or other hard coating, etc.), and/or manufactured from sufficiently hard material providing increased resistance to wear. As provided above, the mill speed may be optimized to obtain a desired product particle size.

Once the product is milled by the milling device 208, the processing (step 324) of the product may continue by classifying the product based on size. In some embodiments, the cell mill 200 may include a classifier that is configured to separate coarse fiber rich product from fine protein rich product. The classifier may comprise one or more screens, rotating bars, and/or sieves configured to separate the product. In some embodiments, the classifier speed can be altered to change the cut point between product and oversize material. Running the classifier slower may allow larger particles to pass through and reduce the purity of the finished product, while running the classifier faster may allow finer particles to pass through and increase the purity of the finished product. Oversize product (i.e., fiber rich product) may be collected in a silo and used for animal feed. Additionally or alternatively, the oversize product may be re-milled (e.g., or back mixed in the cell mill 200) into a fine powder and sold as a food grade fiber. In one embodiment, the classification described herein may be performed at the top of the cell mill 200, as shown in the schematic diagram of FIG. 2.

The method 300 may continue by cooling the extracted protein rich product and/or fiber rich product prior to packaging (step 328). As described above and in conjunction with FIG. 1, the extracted product may be passed through a cooling system 120 to prepare the product for packaging. The cooling system 120 may include a refrigeration unit and one or more chambers, through which, the protein rich and fiber rich product passes to cool. Cooling may include lowering the temperature of the protein rich flour to a temperature below 30 degrees Celsius. In some cases, the product may be stored in temperature controlled or refrigerated silos/containers prior to packaging. Once the product is processed by the cell mill (step 324), the product is stable for storage at a standard range of ambient temperatures, especially 72 degrees Fahrenheit. The product is stable in that the protein rich flour and/or fiber rich flour is sufficiently dry and processed providing an environment resistant to the unprocessed and uncontrolled BSG bacterial growth. The protein rich flour and/or fiber rich flour may be packaged similarly, if not identically, to the method described in conjunction with the packaging station 124 of FIG. 1 (step 332). The method 300 may end at step 340.

Figure 4:
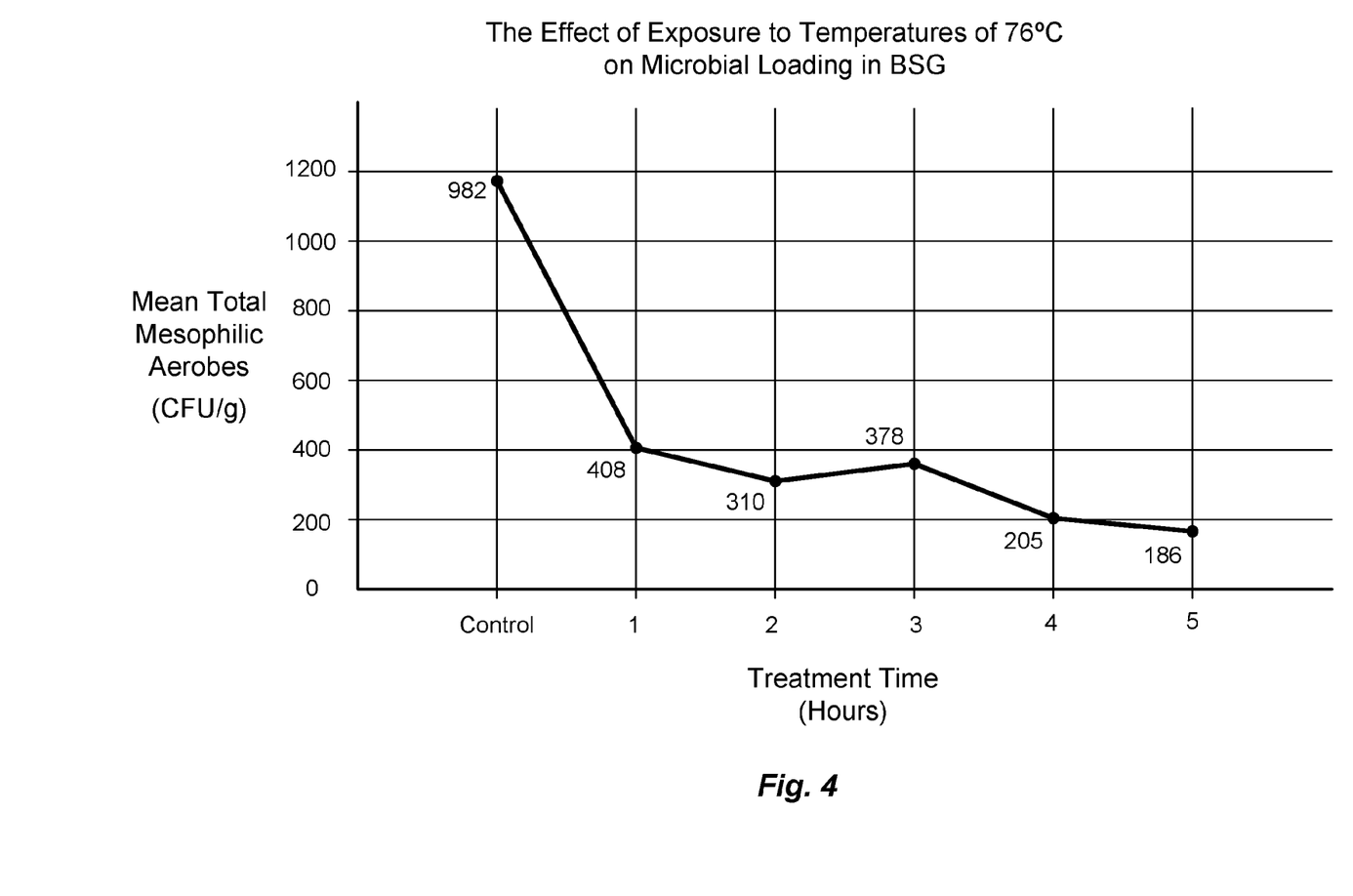
FIG. 4 is a graphical representation of the effects of storing BSG at a heated temperature to control and limit bacterial growth in accordance with embodiments of the present disclosure.

FIG. 4 is a is a graphical representation of the effects of storing BSG at a heated temperature to control and limit bacterial growth in accordance with embodiments of the present disclosure. For example, storing the BSG at a temperature of approximately 76 degrees Celsius may reduce the mean total mesophilic aerobes from 982 CFU/g to 186 CFU/g in approximately five hours of treatment time. As described above, the hot grain storage system 108 may be configured to provide this heated temperature control.

Figure 5:
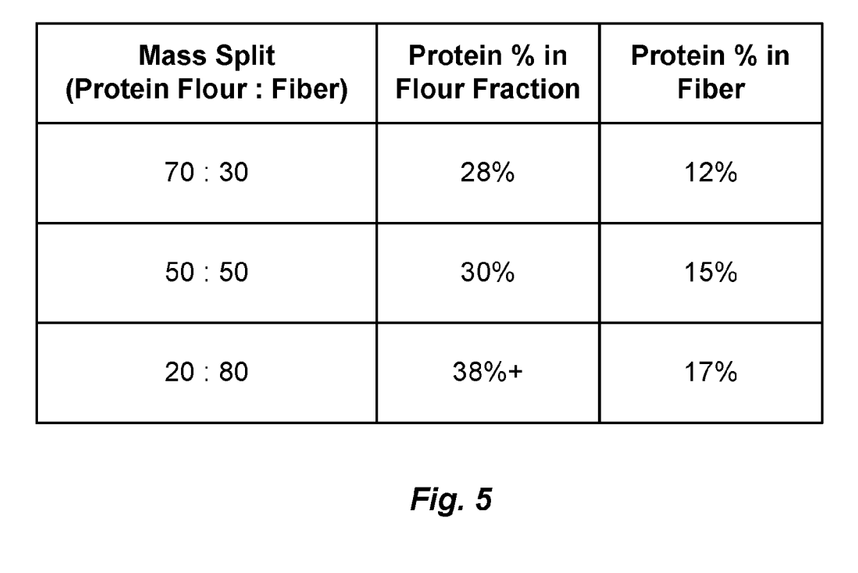
FIG. 5 is a chart of protein and fiber yield percentages from fractionated BSG in accordance with embodiments of the present disclosure.

FIG. 5 is a chart of protein and fiber yield percentages from fractionated BSG in accordance with embodiments of the present disclosure. As illustrated in FIG. 5, splitting the mass of the extracted flour into 70 percent protein flour mass and 30 percent fiber mass produces 28 percent protein in the flour fraction (i.e., the protein rich product) and 12 percent protein in the fiber (e.g., the fiber rich product). A split of 50 percent protein flour mass and 50 percent fiber mass produces 30 percent protein in the protein rich product flour fraction and 15 percent protein in fiber rich product fraction. A split of 20 percent protein flour mass and 80 percent fiber mass yields at least 38 percent protein in the protein rich product flour fraction and 17 percent in fiber rich product fraction. These three different levels represent examples of various levels of purity and yield that can be selected and/or set (e.g., varying rotation speeds of the cell mill, etc.) using the methods 300 and systems 100 described herein.

Figure 6:
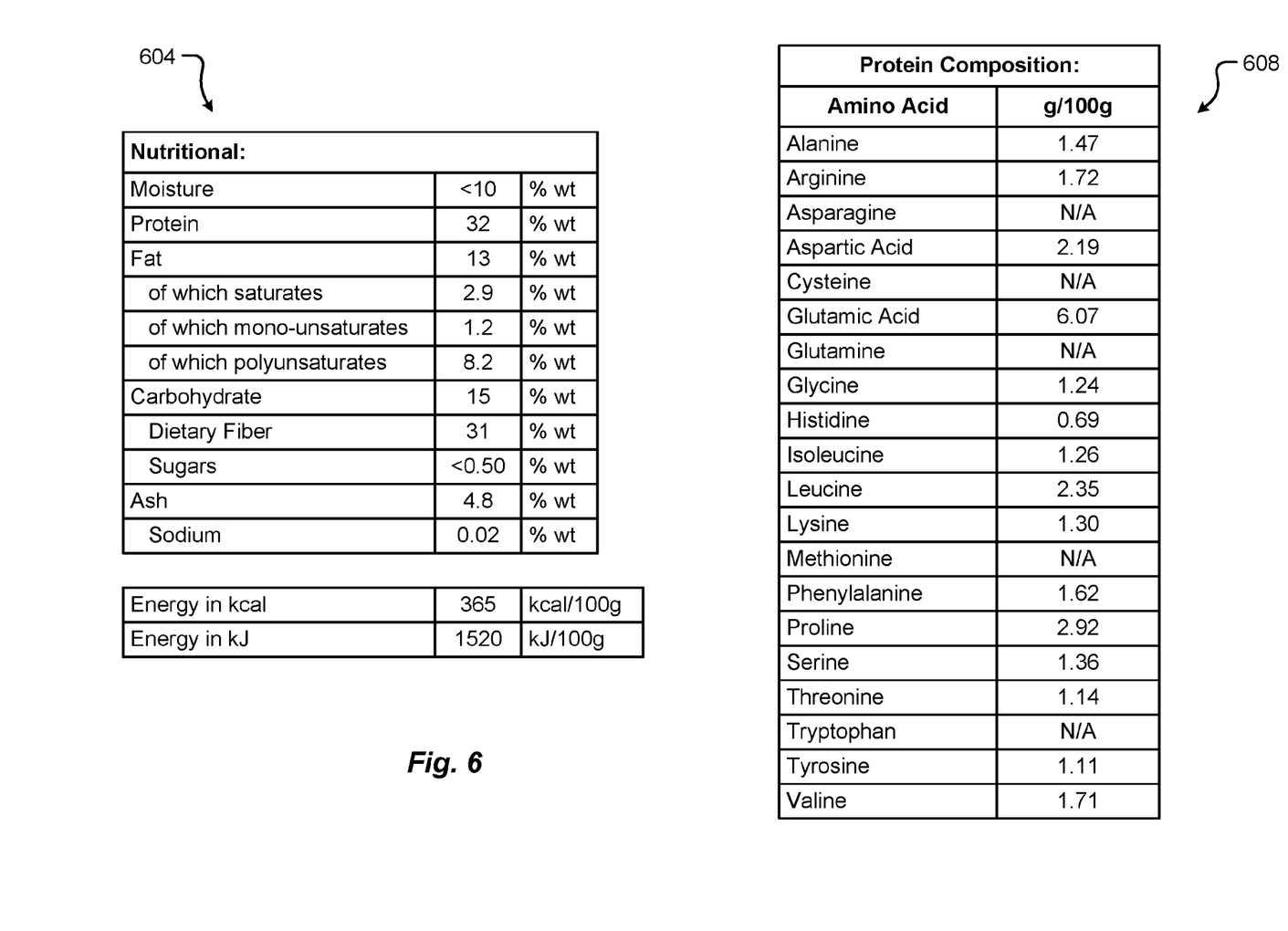
FIG. 6 is a table of nutritional information associated with protein rich product extracted from BSG in accordance with embodiments of the present disclosure.

FIG. 6 is a table of nutritional information associated with protein rich product extracted from BSG in accordance with embodiments of the present disclosure. The table includes nutritional information by percentage weight 604 and the composition 608 of the protein rich product in one example fractionation percentage. As shown in FIG. 6, the protein percentage by weight of the protein rich product is approximately 32% in an example percentage mass split.

Figure 7:
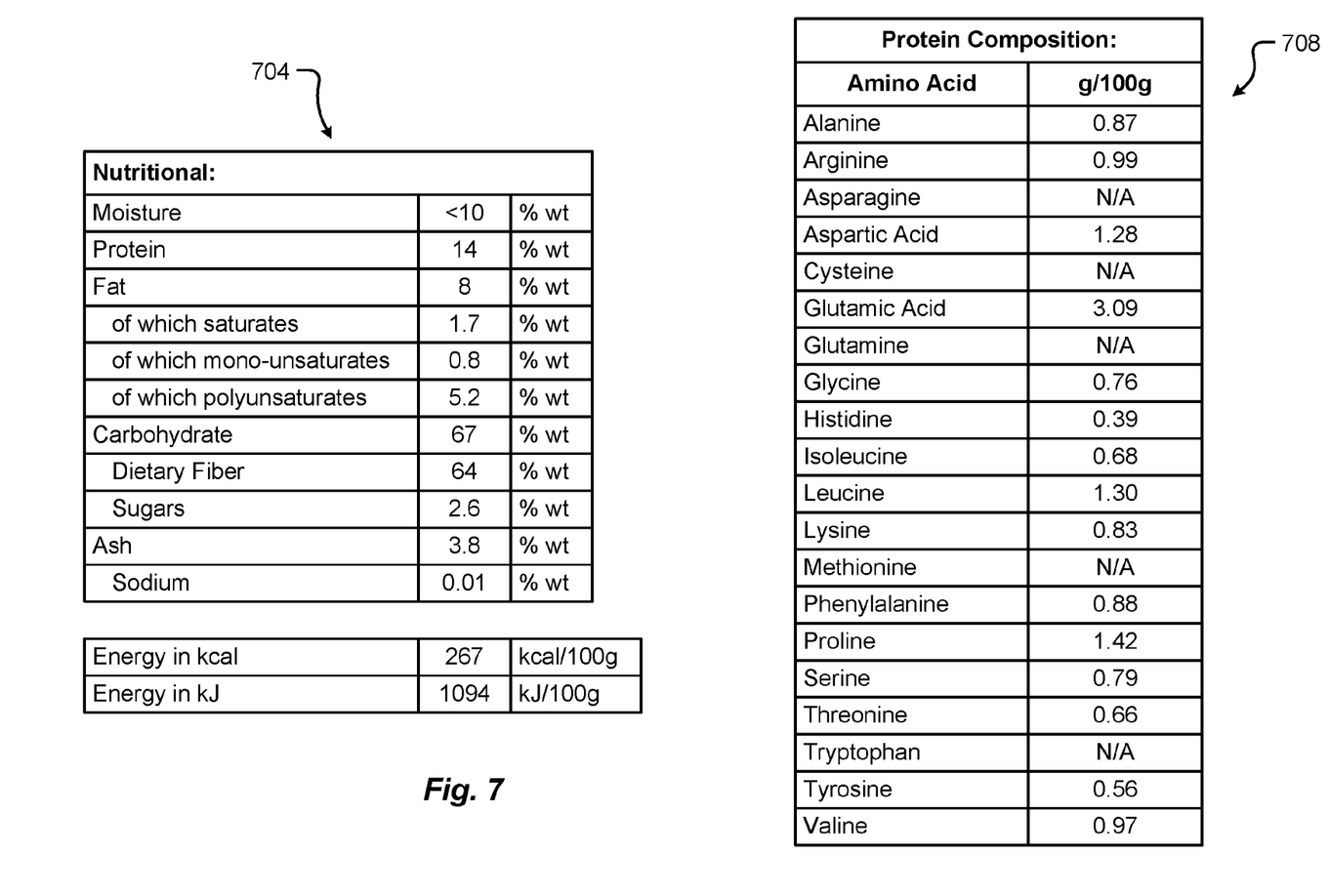
FIG. 7. is a table of nutritional information associated with fiber rich product extracted from BSG in accordance with embodiments of the present disclosure.

FIG. 7. is a table of nutritional information associated with fiber rich product extracted from BSG in accordance with embodiments of the present disclosure. The table includes nutritional information by percentage weight 704 and the composition 708 of the fiber rich product in one example fractionation percentage. As shown in FIG. 7, the protein percentage by weight of the fiber rich product is approximately 14% in an example percentage mass split.

Any of the steps, functions, and operations discussed herein can be performed continuously and automatically.

The exemplary systems and methods of this disclosure have been described in relation to extraction of protein from BSG and/or spent grains. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method of extracting protein from spent grains, comprising: receiving, from a storage unit, spent grains; extracting, via a cell mill, protein rich flour from the spent grains; and packaging, via a packaging system, the protein rich flour in a storage or transportation container.

Aspects of the above method include wherein prior to extracting the protein rich flour from the spent grains, the method further comprises: determining a moisture content of the spent grains; and dewatering the spent grains when the moisture content is above a predetermined threshold value. Aspects of the above method include wherein extracting the protein rich flour from the spent grains includes drying, milling, and fractionating the spent grains. Aspects of the above method include wherein fractionating the spent grains further comprises: classifying the milled spent grains into the protein rich flour and fiber rich flour. Aspects of the above method include wherein prior to packaging the protein rich flour, the method further comprises: cooling, via a refrigeration system, the extracted protein rich flour to a temperature less than 30 degrees Celsius. Aspects of the above method include wherein the spent grains are brewer's spent grains (BSG). Aspects of the above method include wherein the extracted protein rich flour comprises at least 30% protein by weight. Aspects of the above method include wherein the extracted fiber rich flour comprises at least 14% protein by weight.

Embodiments include a system for extracting protein from spent grains, comprising: a hot grain storage system configured to store the spent grains at a controlled temperature; a foreign object detection and removal unit configured to separate metal, ferrous objects, and/or other debris from the spent grains extracted from the hot grain storage system; a drying device that dries the extracted spent grains to acceptable moisture content levels; a milling device that grinds the dried extracted spent grains into a coarse and fine particulate; a fractionation device that separates the coarse and fine particulate into different output streams, a first output stream corresponding to a fiber rich product output stream and a second output stream corresponding to a protein rich product output stream, wherein the separation is based on particle size of the coarse and fine particulate; a cooling system that cools the extracted protein rich product and the fiber rich product; and a packaging station for packaging of the protein rich product and the fiber rich product.

Aspects of the above system include wherein the hot grain storage system comprises a silo and a heating device configured to regulate the controlled temperature of the spent grains. Aspects of the above system include wherein the hot grain storage system comprises an aeration fan that provides steady air flow through the spent grains stored inside the hot grain storage system. Aspects of the above system further comprising: a dewatering device configured to dewater at least a portion of spent grains removed from the spent grains in the hot grain storage system to over 30% dry. Aspects of the above system include wherein the foreign object detection and removal unit includes a drum having magnets arranged in alternating poles around a periphery of the drum, an infeed, a metal discharge chamber, and a non-metal discharge chamber, and wherein the spent grains extracted from the hot grain storage system enter the infeed of the foreign object detection and removal unit, pass by the drum, while the drum is rotating, and wherein the drum collects any ferrous objects in the spent grains extracted from the hot grain storage system as the spent grains move from the infeed to the non-metal discharge chamber.

Embodiments include a method of extracting protein from spent grains, comprising: introducing spent grains received from a hot grain storage unit to a cell mill; drying, via a cell mill, the introduced spent grains; milling, via the cell mill, the dried spent grains into a coarse particulate and a fine particulate, wherein a particle size of the coarse particulate is larger than a particle size of the fine particulate; directing, automatically via the cell mill, the fine particulate to a first output stream exiting the cell mill, wherein the fine particulate includes protein rich material; and directing, automatically via the cell mill, the coarse particulate to a second output stream, wherein the coarse particulate includes fiber rich material.

Aspects of the above method include wherein the protein rich material includes approximately 32% protein by weight, and wherein the fiber rich material includes approximately 14% protein by weight. Aspects of the above method include wherein the coarse particulate is reintroduced to the cell mill for further milling. Aspects of the above method further comprising: cooling, via a refrigeration unit and at least one cooling chamber, the fine particulate to a temperature below 30 degrees Celsius. Aspects of the above method include wherein prior to introducing the spent grains to the cell mill, the method further comprises: determining a moisture content of the spent grains; and dewatering the spent grains when the moisture content is determined to be above a predetermined threshold value. Aspects of the above method include wherein the fine particulate exiting the cell mill via the first output stream is redressed by removing large objects and foreign material from the fine particulate. Aspects of the above method include wherein milling the dried spent grains into a coarse particulate and a fine particulate, includes subjecting the dried spent grains to a rotating classifier including screen elements that are configured to separate fiber and protein extract from the milled spent grains.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique

What is claimed is:

1. A method of extracting protein material from brewer's spent grains, comprising:
    maintaining brewer's spent grains in a hot grain storage unit at a controlled temperature of approximately 76 degrees Celsius for approximately five hours of treatment time;
    receiving, from the hot grain storage unit after the treatment time, the brewer's spent grains;
    introducing, after the treatment time, the brewer's spent grains received from the hot grain storage unit to a cell mill;
    milling, via the cell mill, the brewer's spent grains into a coarse particulate and a fine particulate, wherein a particle size of the coarse particulate is larger than a particle size of the fine particulate;
    directing, automatically via the cell mill, the fine particulate to a first output stream exiting the cell mill, wherein the fine particulate includes protein material;
    directing, automatically via the cell mill, the coarse particulate to a second output stream, wherein the coarse particulate includes fiber material; and
    packaging, via a packaging system, the protein material as a protein flour extracted from the brewer's spent grains in a storage or transportation container, the protein flour comprising at least 30% protein by weight.

2. The method of claim 1, wherein prior to milling the brewer's spent grains, the method further comprises:
    determining a moisture content of the brewer's spent grains; and
    dewatering the brewer's spent grains when the moisture content is determined to be above a predetermined threshold value.

3. The method of claim 2, wherein prior to packaging the protein material, the method further comprises:
    cooling, via a refrigeration system, the protein material to a temperature less than 30 degrees Celsius.

4. The method of claim 3, wherein the fiber material comprises fiber flour comprising at least 14% protein by weight.

5. The method of claim 1, further comprising:
    packaging, via the packaging system, the fiber material as a fiber flour extracted from the brewer's spent grains in a shipping container, wherein the shipping container is a separate container from the storage or transportation container.

6. The method of claim 5, wherein the fiber flour comprises at least 14% protein by weight.

7. The method of claim 1, wherein maintaining the brewer's spent grains in the hot grain storage unit at the controlled temperature for the treatment time reduces a mean total of mesophilic aerobes in the brewer's spent grains from over 900 CFU/g to below 200 CFU/g.

8. A system for extracting a protein product from brewer's spent grains, comprising:
    a hot grain storage system configured to store the brewer's spent grains at a controlled temperature of approximately 76 degrees Celsius for approximately five hours of treatment time;
    a foreign object detection and removal unit configured to separate metal, ferrous objects, and/or other debris from the brewer's spent grains received from the hot grain storage system;
    a drying device that dries the brewer's spent grains to a predetermined threshold value;
    a milling device that grinds the dried brewer's spent grains into a coarse particulate and a fine particulate;
    a fractionation device that separates the coarse particulate and the fine particulate into different output streams, a first output stream corresponding to a fiber product output stream comprising a fiber product and a second output stream corresponding to a protein product output stream comprising the protein product comprising at least 30% protein by weight, wherein the separation is based on particle size of the coarse particulate and the fine particulate;
    a cooling system that cools the separated protein product and the fiber product; and
    a packaging station for packaging of the separated protein product and the fiber product.

9. The system of claim 8, wherein the cooling system cools the separated protein material to a temperature less than 30 degrees Celsius.

10. The system of claim 8, wherein the hot grain storage system comprises a silo and a heating device configured to regulate the controlled temperature of the brewer's spent grains.

11. The system of claim 10, wherein the hot grain storage system comprises an aeration fan that provides steady air flow through the brewer's spent grains stored inside the hot grain storage system.

12. The system of claim 10, further comprising:
    a dewatering device configured to dewater at least a portion of brewer's spent grains removed from the brewer's spent grains in the hot grain storage system to a predetermined percentage of dryness.

13. The system of claim 10, wherein the foreign object detection and removal unit includes a drum having magnets arranged in alternating poles around a periphery of the drum, an infeed, a metal discharge chamber, and a non-metal discharge chamber, and wherein the brewer's spent grains received from the hot grain storage system enter the infeed of the foreign object detection and removal unit, pass by the drum, while the drum is rotating, and wherein the drum collects any ferrous objects in the brewer's spent grains received from the hot grain storage system as the brewer's spent grains move from the infeed to the non-metal discharge chamber.

14. A method of extracting protein from brewer's spent grains, comprising:
    maintaining brewer's spent grains in a hot grain storage unit at a controlled temperature of approximately 76 degrees Celsius for approximately five hours of treatment time;
    introducing, after the treatment time, the brewer's spent grains received from a hot grain storage unit to a cell mill;
    drying, via a cell mill, the introduced brewer's spent grains producing dried brewer's spent grains;

milling, via the cell mill, the dried brewer's spent grains into a coarse particulate and a fine particulate, wherein a particle size of the coarse particulate is larger than a particle size of the fine particulate;

directing, automatically via the cell mill, the fine particulate to a first output stream exiting the cell mill, wherein the fine particulate includes protein material;

directing, automatically via the cell mill, the coarse particulate to a second output stream, wherein the coarse particulate includes fiber material; and cooling, via a refrigeration unit and at least one cooling chamber, the fine particulate to a temperature below 30 degrees Celsius.

15. The method of claim 14, wherein the protein material includes approximately 32% protein by weight, and wherein the fiber material includes approximately 14% protein by weight.

16. The method of claim 14, wherein the coarse particulate is reintroduced to the cell mill for further milling.

17. The method of claim 14, wherein prior to introducing the brewer's spent grains to the cell mill, the method further comprises:

determining a moisture content of the brewer's spent grains; and dewatering the brewer's spent grains when the moisture content is determined to be above a predetermined threshold value.

18. The method of claim 17, wherein the fine particulate exiting the cell mill via the first output stream is redressed by removing large objects and foreign material from the fine particulate.

19. The method of claim 18, wherein milling the dried brewer's spent grains into a coarse particulate and a fine particulate, includes subjecting the dried brewer's spent grains to a rotating classifier including screen elements that are configured to separate fiber and protein extract from the dried brewer's spent grains.

20. The method of claim 18, wherein maintaining the brewer's spent grains in the hot grain storage unit at the controlled temperature for the treatment time reduces a mean total of mesophilic aerobes in the brewer's spent grains from over 900 CFU/g to below 200 CFU/g.

* * * * *